May 7, 1946.
J. W. WIESMANN
2,399,776
GROMMET CRIMPING TOOL
Filed Sept. 9, 1944
2 Sheets-Sheet 1
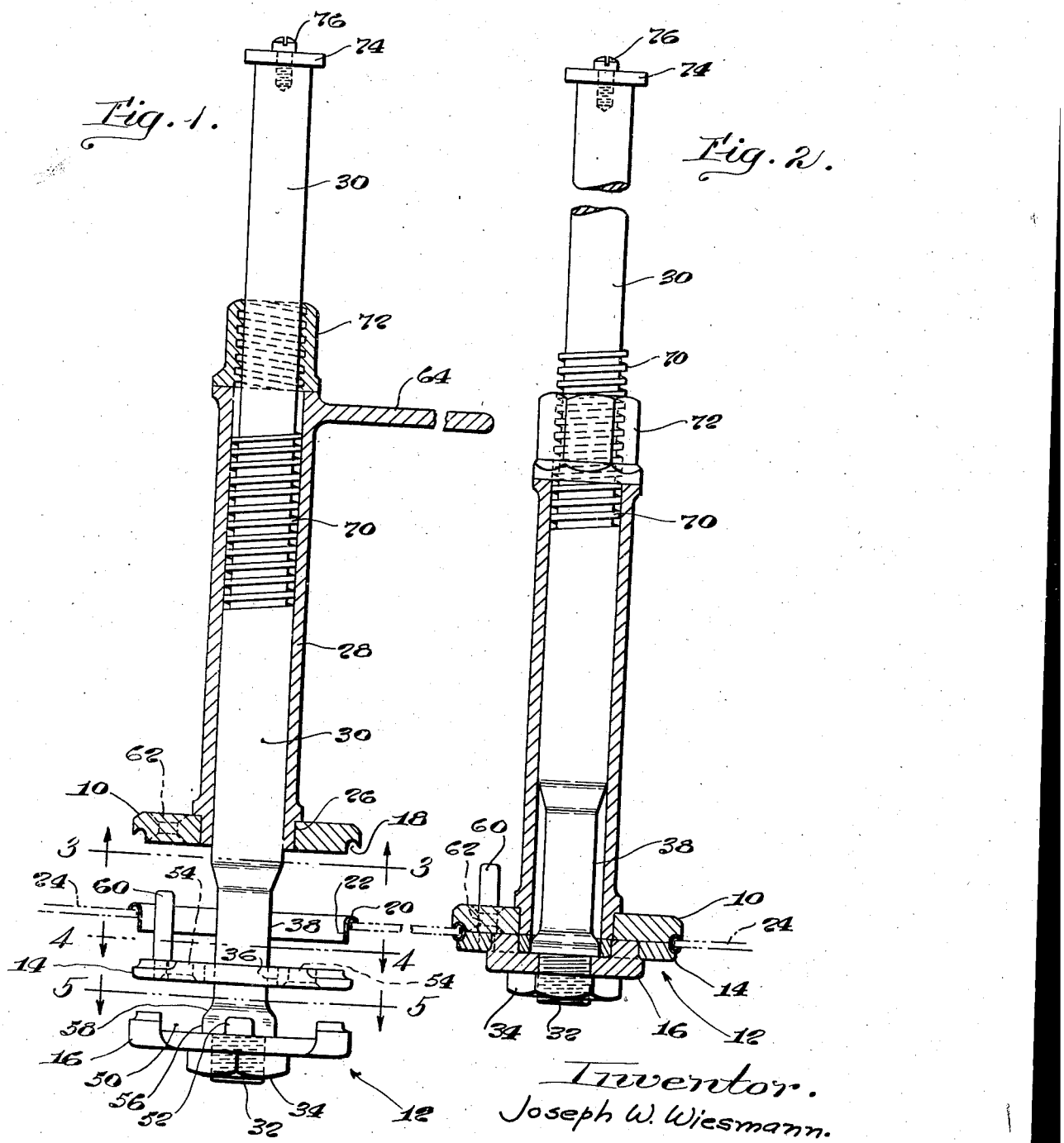
Inventor.
Joseph W. Wiesmann.
by J. Stanley Churchill
Att'y.

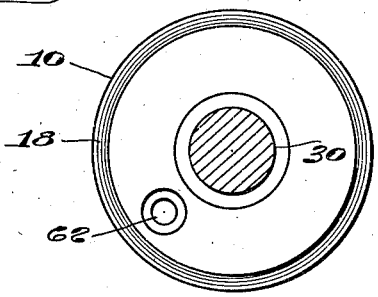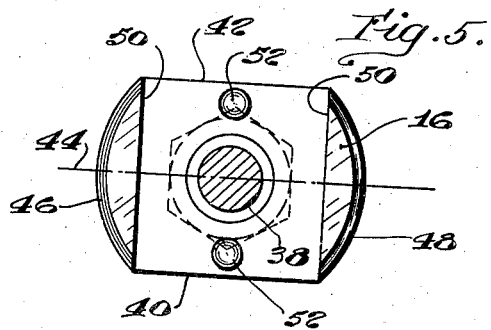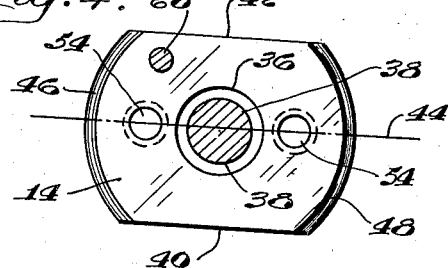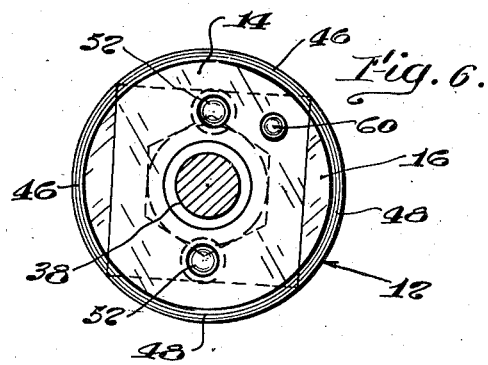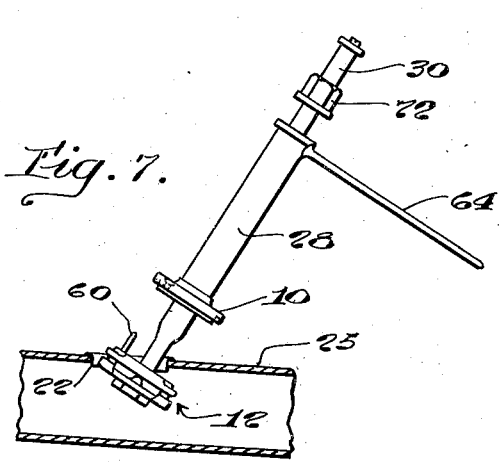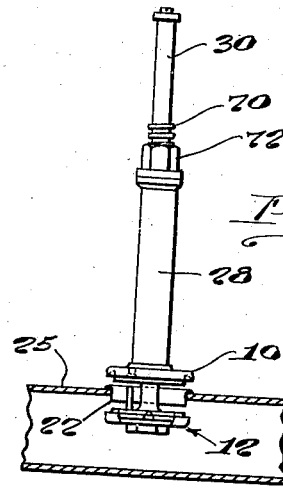

Patented May 7, 1946

2,399,776

UNITED STATES PATENT OFFICE 2,399,776

GROMMET CRIMPING TOOL

Joseph W. Wiesmann, Pittsburgh, Pa., assignor to H. H. Robertson Company, Pittsburgh, Pa., a corporation of Pennsylvania Application September 9, 1944, Serial No. 553,361

10 Claims. (Cl. 218—25)

This invention relates to a tool and particularly to a tool for crimping grommets.

The invention has for an object to provide a novel and improved grommet crimping tool for use in bushing an opening, characterized by circular die members for cooperation with opposite edges of the grommet of greater diameter than the opening to be bushed and in which the lower die is designed to permit entrance thereof through the opening for the purpose specified whereby to facilitate the installation of grommets in openings disposed in relatively inaccessible places.

With this general object in view, and such others as may hereinafter appear, the invention consists in the grommet crimping tool hereinafter described and particularly defined in the claims at the end of this specification.

In the drawings illustrating the preferred embodiment of the invention, Fig. 1 is a longitudinal section of a tool embodying the present invention; Fig. 2 is a similar view showing the tool in a different position of operation; Fig. 3 is an inverted plan view of the upper die, as seen from the line 3—3 of Fig. 1; Figs. 4 and 5 are plan views of component lower die sections, as seen from the lines 4—4 and 5—5 respectively; Fig. 6 is a plan view of the lower die sections assembled in operative position; and Figs. 7 and 8 are detail views illustrating the use of the present tool.

In general the present invention contemplates a novel grommet crimping tool particularly adapted for use in applying a grommet about the edges of an opening formed in a metal sheet and is particularly useful for bushing an opening in a wall of a closed duct, such as a duct employed for carrying wires in a wire distributing system, and in which the duct is accessible from but one side thereof so as to prevent the introduction of a cooperative crimping member, larger than the opening itself, in to the interior of the duct. To this end, the present tool is characterized by separable lower die sections, each section being of a size and shape to permit introduction thereof through the opening to be bushed and which may then be assembled to form a composite die for cooperation with the upper die.

Referring now to the drawings, the present grommet crimping tool comprises an upper die member 10 and a lower composite die member, indicated generally at 12, comprising two separable sections 14, 16 of a size and shape such that when separated and placed in superposed relation they may be introduced through the opening to be bushed, and, after being introduced through the opening, may be fitted together to form a composite die for cooperation with the upper die member 10 on the opposite side of the opening.

As herein shown, the upper die member 10 comprises an integral disc having an annular groove 18 in the lower edge thereof for cooperation with the preformed rolled edge 20 of a grommet 22 placed in an opening in a metal sheet indicated by dotted lines 24 or in an opening formed in one wall of a closed duct 25 as shown in Fig. 7. The upper die 10, as herein illustrated, is fixed against a shouldered portion 26 formed in the lower end of a tubular member or sleeve 28 within which an elongated rod 30 is slidingly received. One of the lower die sections, 16, is fast on the lower end of the rod 30, being fitted over a threaded extension 32 of the rod and held in place by a nut 34, as best shown in Fig. 2. The other section, 14, of the lower die is free on the rod 30, the section 14 being provided with an enlarged opening 36, and the rod 30 being reduced in diameter as indicated at 38 to permit the die section to be moved longitudinally of the rod to effect separation of the die sections.

As best shown in Figs. 4 and 5, each die section 14, 16 is of a general circular shape with a segment cut from opposing sides thereof leaving a central area defined by parallel chords or lines 40, 42 equidistantly spaced from a line 44 passing through the center of the circle. Both sections 14, 16 are provided with opposing arcuate grooves 46, 48 in their upper edges so that when the sections are assembled to form a composite die a continuous annular groove is provided for cooperation with the lower edge of the grommet 22. As herein illustrated, the fixed lower die section 16 is provided with a straight groove 50 in its upper face extending at right angles to the sides 40, 42 of the section 16, the groove being of a depth substantially equal to the thickness of the die section 14 and, of a width substantially equal to the width of said section. As thus constructed when the section 14 is rotated on its axis to present the same at right angles to the section 16, the section 14 may be dropped into the groove 50 to form the composite lower die member 12. In other words, the arcuate portions of the section 14 replace the opposed segments which were cut off the section 16, as clearly illustrated in Fig. 6.

In order to assure proper alignment of the die sections 14, 16 when assembled in operative relation to form an annular groove, two diametrically opposed upstanding pins 52 formed in the fixed section 16 are arranged to be received in openings 54 in the section 14. The central opening 36 in the section 14 fits loosely over the enlarged diameter 56 of the rod 30 and the tapered portion 58 of the rod, between the reduced diameter 38 and the diameter 56, may serve as a guide to align the section 14 substantially centrally with the section 16 during the assembling operation.

From the description thus far it will be observed that when the sections 14, 16 of the lower die 12 are separated and superimposed one upon the other with their flat sides parallel, the die sections may be introduced through the grommet 22 in the opening to be bushed, by tipping the tool as illustrated in Fig. 7. During this operation, the rod 30 is extended through the sleeve 28 a sufficient distance to prevent interference by the upper die 10 fixed to the lower end of the sleeve 28. This feature is of particular advantage when the opening to be bushed is disposed in a relatively inaccessible position, such as an opening formed in the lower wall of a duct for communication with an underlying conduit in a wire distributing system, the tool first being extended through a preformed access opening in the upper wall of the duct.

In the operation of the device, after the die sections 14, 16 have been introduced through the opening, as above described, the tool is vertically disposed, as shown in Fig. 8, and, the die section 14 is manipulated to rotate it 90 degrees into assembled relation with the section 16. In order to facilitate such rotation, the section 14 is provided with an upstanding pin 60 arranged to be received in an opening 62 in the upper die 10 when the latter is lowered, and when thus engaged rotation of the sleeve 28 with relation to the rod 30 effects rotation of the section 14. As herein shown, a handle 64 extending at right angles from the upper portion of the sleeve 28 may be provided to facilitate rotation of the sleeve. When alignment with the lower section 16 is effected, the section 14 will drop down into the groove 50, as described.

When thus assembled, the dies 10 and 12 are brought into cooperating relation against the opposite sides of the grommet 22 by raising the rod 30 and lowering the sleeve 28, and, sufficient pressure is applied to crimp the grommet about the opening as illustrated in Fig. 2. As herein shown, in order to urge the dies toward each other with sufficient pressure to crimp the grommet, the rod 30 is provided with a threaded portion 70 arranged to cooperate with a nut 72 disposed between the top of the sleeve 28 and a stop washer 74 secured to the upper end of the rod 30 by a screw 76. When the nut 72 is engaged with the threaded portion 70 and rotated in one direction against the top of the sleeve 28, the rod 30 is urged upwardly and the sleeve 28 is urged downwardly, thus bringing the dies 10 and 12 into cooperating engagement with the grommet 22. Upon crimping of the grommet, the nut 72 is rotated in the opposite direction until it is entirely free from the threaded portion 70 whereupon it may slide freely on the rod 30 when the sleeve 28 is raised to withdraw the tool. In order to effect complete withdrawal of the tool, the die sections 14 and 16 are again arranged in superposed relation, as above described, and upon tilting of the tool the lower die sections may be withdrawn through the crimped opening. The nut 72 may be of hexagonal shape to permit the use of a wrench thereon during the crimping operation.

From the above description, it will be observed that the present crimping tool is simple in construction and efficient in operation and that the tool may be used with particular advantage in relatively inaccessible places, such as when used for applying a grommet about an opening in one wall of a closed duct in which access to the interior of the duct is limited by the size of the opening to be bushed.

While the preferred embodiment of the invention has been herein illustrated and described, it will be understood that the invention may be embodied in other forms within the scope of the following claims.

Having thus described the invention, what is claimed is:

1. A grommet crimping tool comprising a pair of circular die members mounted for relative movement into and out of crimping position, one of said die members comprising two separable sections, each section being of a size and shape to permit introduction thereof through an opening of less diameter than the assembled sections of said one die member, said sections being capable of assembly after being introduced through the opening to form a composite die for cooperation with the other die to perform the crimping operation.

2. A grommet crimping tool comprising a pair of cooperative die members, at least one of said die members being circular, said one die member comprising a plurality of separable sections, each section being of a size and shape to permit introduction thereof through an opening of less diameter than the assembled sections of said one die member, said sections being capable of assembly after being introduced through the opening to form a composite die for cooperation with the other die to perform the crimping operation.

3. A grommet crimping tool comprising a pair of circular die members mounted for relative movement into and out of crimping position, one of said die members comprising two separable sections, each section being of a size and shape to permit introduction thereof through an opening of less diameter than the assembled sections of said one die member, said sections being capable of assembly after being introduced through the opening to form a composite die for cooperation with the other die, and means for urging said dies together to perform the crimping operation.

4. A grommet crimping tool comprising a pair of cooperating die members, at least one of said die members being circular, said one die member comprising a plurality of separable sections, each section being of a shape and area such as to permit introduction thereof through an opening of less diameter than the largest dimensions of said sections upon tilting of the tool, said sections being capable of assembly after being introduced through the opening to form a composite die for cooperation with the other die to perform the crimping operation.

5. A grommet crimping tool comprising a pair of cooperating die members, at least one of said die members being circular, said one die member comprising two separable sections, each section having opposed straight portions and opposed arcuate portions and being of a size and shape whereby to permit introduction thereof through an opening of less diameter than the assembled die member upon tilting of the tool, said sections being capable of assembly after being introduced through the opening to form a composite die for cooperation with the other die to perform the crimping operation.

6. A grommet crimping tool comprising a pair of cooperating die members, at least one of said die members being circular, said one die member comprising two separable sections, each section being of a shape defined by two parallel lines equidistantly spaced from a line passing through the center thereof and of a size whereby to permit introduction thereof through an opening of less diameter than the assembled die member upon tilting of the tool, said sections being capable of assembly after being introduced through the opening to form a composite die for cooperation with the other die to perform the crimping operation.

7. A grommet crimping tool for bushing an opening comprising a pair of circular die members including an upper die and a lower die, each of said dies being of greater diameter than the opening to be bushed, a sleeve for supporting said upper die, an elongated rod slidable within said sleeve for supporting said lower die, said lower die comprising two separable sections, each section being of a size and shape such as to permit introduction thereof through an opening of less diameter than the assembled die member, said sections being capable of assembly after being introduced through the opening to form a composite die, and means for relatively moving said sleeve and said rod to effect movement of said dies into cooperating engagement with the grommet to perform the crimping operation.

8. A grommet crimping tool for bushing an opening comprising a pair of circular die members including an upper die and a lower die, each of said dies being of greater diameter than the opening to be bushed, a sleeve for supporting said upper die, an elongated rod slidable within said sleeve for supporting said lower die, said lower die comprising two separable sections, each section being of a size and shape such as to permit introduction thereof through an opening of less diameter than the assembled die member, said sections being capable of assembly after being introduced through the opening to form a composite die, said rod being provided with a threaded portion, and a nut cooperating with said threaded portion and arranged to bear against the upper edge of said sleeve whereby to effect relative movement of said rod and the sleeve to urge said dies into cooperative engagement with the grommet to perform the crimping operation.

9. A grommet crimping tool for bushing an opening comprising a pair of circular die members including an upper die and a lower die, each of said dies being of greater diameter than the opening to be bushed, a sleeve for supporting said upper die, an elongated rod slidable within said sleeve for supporting said lower die, said lower die comprising two separable sections, said sections having equal areas of a size such as to permit introduction thereof through an opening of less diameter than the assembled die member upon arrangement of said sections in disassembled relation, one of said sections being capable of movement into assembled relation with its component section after being introduced through said opening to form a composite die for cooperation with said upper die to perform the crimping operation and connections between said upper and lower dies for rotating said one section into and out of assembled relation.

10. A grommet crimping tool for bushing an opening comprising a pair of circular die members including an upper die and a lower die, each of said dies being of greater diameter than the opening to be bushed, a sleeve for supporting said upper die, an elongated rod slidable within said sleeve for supporting said lower die, said lower die comprising two separable sections, said sections having equal areas of a size such as to permit introduction thereof through an opening of less diameter than the assembled die member upon arrangement of said sections in disassembled relation, one of said sections being capable of movement into assembled relation with its component section after being introduced through said opening to form a composite die for cooperation with said upper die to perform the crimping operation and connections between said upper and lower dies for rotating said one section into and out of assembled relation, said lower die sections being provided with aligning means for assuring proper registration of the die members when assembled in operative position.

JOSEPH W. WIESMANN.